United States Patent
Campbell et al.

(10) Patent No.: US 6,707,177 B1
(45) Date of Patent: Mar. 16, 2004

(54) LUBRICATION RECIRCULATION AND WEAR PROTECTIVE MEMBER FOR ELECTRIC MOTOR

(75) Inventors: Robert Campbell, Tecumseh (CA); Steve C. Bailey, Tecumseh (CA); Blaise Rouleau, Paris (FR)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/047,650

(22) Filed: Jan. 15, 2002

(51) Int. Cl.⁷ ................................................ H02K 5/00
(52) U.S. Cl. ............................ 310/45; 310/89; 310/87; 310/239
(58) Field of Search ............................ 310/87, 89, 239

(56) References Cited

U.S. PATENT DOCUMENTS

| | | | | |
|---|---|---|---|---|
| 3,814,961 A | * | 6/1974 | Nelson | ........................ 310/87 |
| 5,789,841 A | | 8/1998 | Wang | ........................ 310/179 |
| 5,977,672 A | | 11/1999 | Vacca | ........................ 310/90 |
| 6,215,215 B1 | * | 4/2001 | Huber | ........................ 310/89 |
| 6,518,686 B2 | * | 2/2003 | Campbell | .................... 310/239 |

* cited by examiner

Primary Examiner—Nicholas Ponomarenko
Assistant Examiner—Iraj A. Mohandesi
(74) Attorney, Agent, or Firm—J. Gordon Lewis

(57) ABSTRACT

An electric motor includes a housing having a bushing mounted at a first end about a shaft extending through the housing. A lubricant recirculation member formed of a one-piece assembly of unitarily joined oil throw and vibration dampening material portions is fixedly mounted on the shaft between a commutator and the bushing. The lubricant recirculation member recirculates lubricant from the bushing back toward the bushing and away from the commutator and provides a vibration dampening layer between the bushing and the commutator.

20 Claims, 6 Drawing Sheets

LUBRICATION RECIRCULATION AND WEAR PROTECTIVE MEMBER FOR ELECTRIC MOTOR

CROSS REFERENCE TO CO-PENDING APPLICATION

This application claims subject matter which is generally disclosed in co-pending U.S. patent application Ser. No. 09/791,349 filed Feb. 23, 2001, now U.S. Pat. No. 6,518,686, in the names of Robert Campbell and Steve Bailey, entitled Brush Card Bushing Holder For Electric Motor.

BACKGROUND OF THE INVENTION

Direct current electric motors are commonly used to drive a fan or blower in a vehicle ventilating system. Such motors have a rotating shaft which extends through a motor housing having one end carrying a first bearing or bushing supporting one portion of the shaft and an opposed end carrying an end plate. A second bearing or bushing is typically held in place in the end plate by a retainer and engages an opposed end portion of the rotating shaft.

As shown in FIG. 1, a prior art electric blower motor for a vehicle ventilating system has a fixed part formed of a generally cylindrical housing or metal body shell having a base wall at one end with an enlarged boss which receives the first bearing or bushing. An end plate is fixedly joined to the other end of the housing. Permanent magnets are mounted on the inner surface of the body shell and surround the shaft. Brushes are mounted in an electrically insulating brush holder or card which is disposed adjacent to the end plate. The brushes make contact with a rotating part or armature of the motor which is mounted on the drive shaft.

The second bearing or bushing is mounted in the end plate by means of a retainer plate. An oil throw washer, a separate wear washer and a separate isolation washer are mounted within the housing body between the armature and the second bushing. The oil throw washer is shaped to re-circulate lubricant which has been expelled from the lubricant-impregnated second bushing back toward the second bushing.

In this typical motor configuration, the oil throw washer is disposed in engagement with the commutator. The isolation washer is then interposed between the oil throw washer and the Nylatron (Nylon 6, 6) wear washer which acts as a wear surface in contact with the second bearing.

However, this design requires three separate parts which increase assembly time.

Thus, it would be desirable to provide an electric motor in which a lubricant recirculation path is formed adjacent to a lubricant impregnated bearing and wear protection and vibration dampening characteristics are obtained with fewer parts and improved performance over prior art motor designs.

SUMMARY

The present invention is a lubricant recirculation member for an electric motor which provides multiple functions in a single unitary part.

The motor includes a housing having first and second ends. A rotatable shaft extends through the housing. A commutator is disposed in the housing about the shaft. A bushing is mounted in the housing in engagement with the shaft. The lubricant recirculation member is disposed in a housing about the shaft between the commutator and the bushing. The lubricant recirculation member is in the form of a body having a unitarily joined first lubricant recirculation end wear surface portion and a second vibration dampening portion.

The first portion of the body has an internal cavity with a sidewall shape to recirculate lubricant away from the commutator. Specifically, the first portion has a base with a wear surface engaged with the bushing. The sidewall extends non-linearly away from the base to form a pocket with the base to collect and recirculate lubricant from the bushing back toward the bushing where it is re-absorbed by the bushing.

The first and second portions of the body have complimentary, interlocking members which mechanically interlock the first and second portions together.

Preferably, the second portion of the body is formed of a thermoplastic elastomer. Specifically, in one example, the thermoplastic elastomer is polyester co-polymer.

Complimentary peripheral interlock members may be optionally formed on the first and second portions of the body. The interlock members include annular radially inward and radially outward complimentary formed members to provide added mechanical interlock between the first and second portions.

In another aspect of the invention, a plurality of circumferentially spaced fingers extend from the first portion into a central bore in the second portion. A radially innermost surface of each of the plurality of fingers engages the shaft of the motor to center the lubricant recirculation member about the shaft. The adjacent resilient material of the second portion between the fingers seals the shaft.

The lubricant recirculation member, or oil slinger, is mounted between the commutator and rear or second bushing. Any oil or lubricant excreted from bushing is returned by the oil slinger through a pocket formed in the oil slinger back to the outer surface of the bushing where it is reabsorbed. This prevents the lubricant from leaking to other electrically conductive portions of the motor interfering with efficient motor operation or causing objectionable noise.

The lubricant recirculation member, or, oil slinger, according to the present invention is formed as a single piece thereby reducing the overall cost of providing the same functions as the three separate washers in prior art motors. Thus, in a single part, the lubricant recirculation member or oil slinger of the present invention provides the function of recirculating the bushing lubricant back into the bushing system, protects the commutator from lubricant contamination, provides a vibration dampening material layer between the commutator and the bearing or bushing, and provides a wear surface between the bushing and the lubricant recirculation portion of the oil slinger.

BRIEF DESCRIPTION OF THE DRAWINGS

The various features, advantages, and other uses of the present invention will become more apparent by referring to the following detailed description and drawing in which.

DETAILED DESCRIPTION

Figure 1:
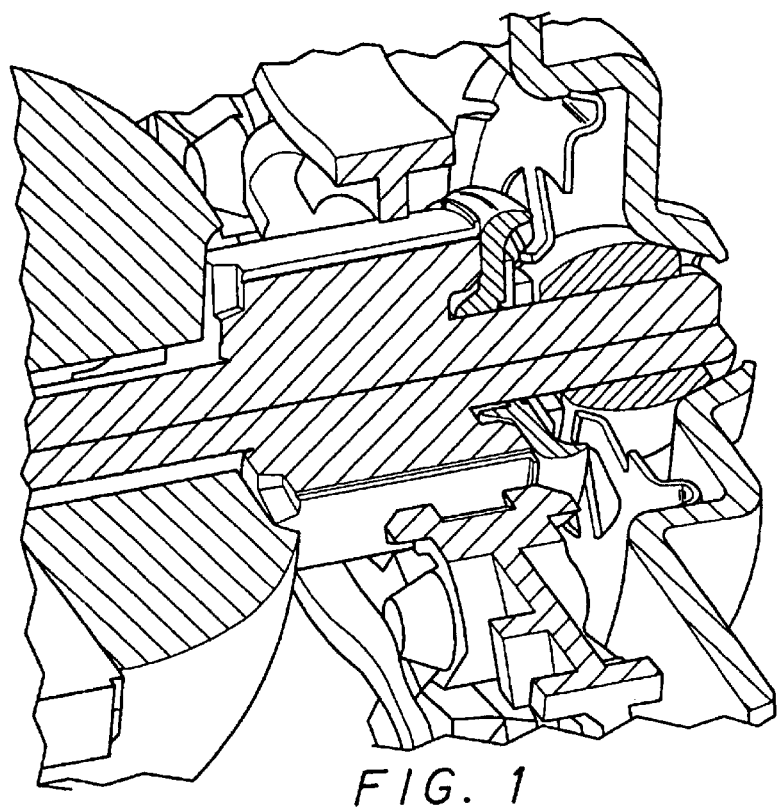
FIG. 1 is an enlarged, partial, perspective view of a prior art blower motor.

Referring now to FIGS. 2–7, there is depicted a motor 10 which is ideally suited for driving a fan or blower in a motor vehicle ventilation system, such as a heating and air-conditioning system, not, shown. As shown in detail in FIG. 2, the motor 10 includes a metal body or housing 12 of generally cylindrical form. The housing 12 has a sidewall 14 extending between a first end 16 and opposed second end 18. The first end 16 has a raised boss or end plate 20. The boss 20 defines an internal cavity within the housing 12 for receiving a first bearing or bushing 22. An aperture is formed in the first end 16 to allow passage of a rotatable shaft 24 therethrough.

The second end 18 of the housing 12 is provided with a plurality of longitudinally inward extending notches or recesses 28. A plurality of bendable tabs 13 project outward from the second end 18.

A plurality of arcuate magnets 32 are fixedly mounted to the inner surface of the sidewall 14 at diametrically opposed positions in the housing 12. An armature 34 is rotatably disposed between the magnets 32.

The second end 18 of the housing 12 would normally be closed by a separate end plate, as in the prior art blower motor shown in FIG. 1. In the present invention, an end plate, a second bushing retainer means and the holders for a plurality of brushes are integrated into a one-piece integral brush card bushing holder 30 which is shown in greater detail in FIGS. 3–7. The integral brush card bushing holder 30, hereafter referred to as the "holder 30", also functions as an end cap in that it is fixedly joined to and spans the second end 18 of the housing 12.

Figure 5:
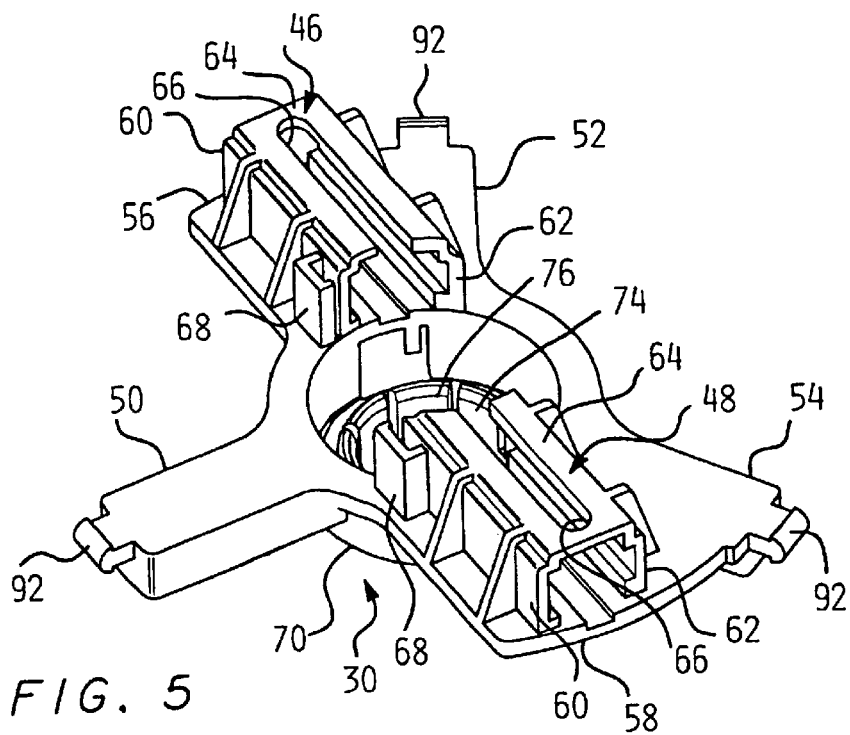
FIGS. 5, 6, and 7 are top, rear and side perspective views of the integral brush card bushing holder shown in FIGS. 3 and 4, with the brushes and brush biasing springs not shown.
Figure 6:
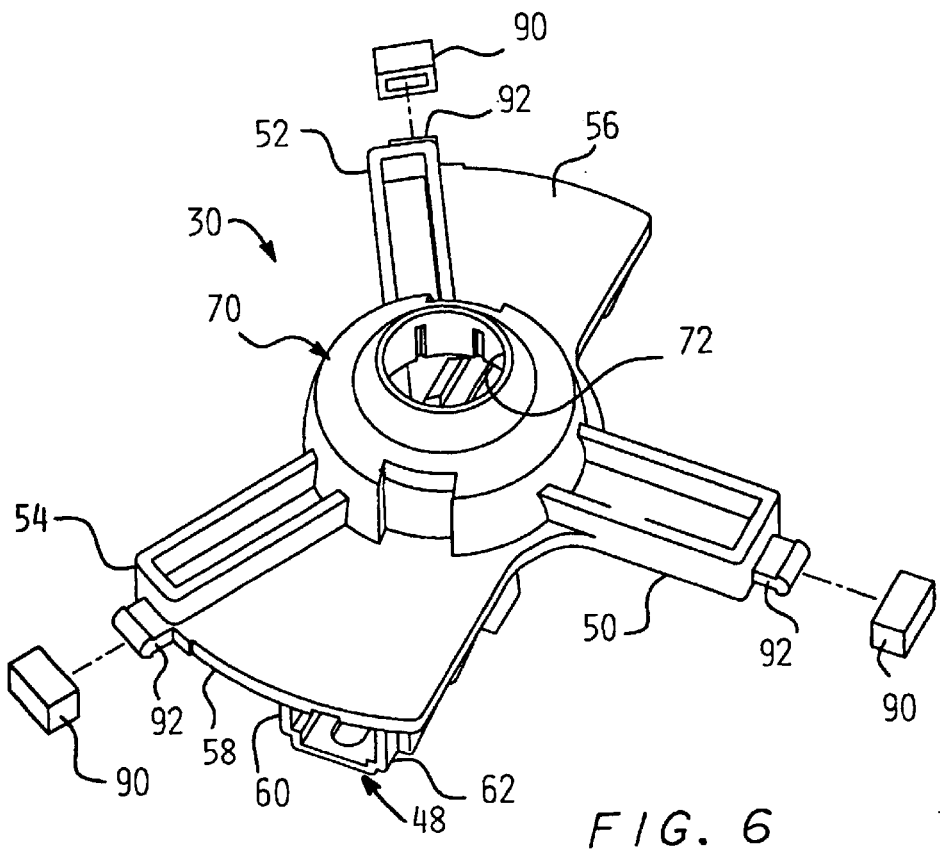
Figure 7:
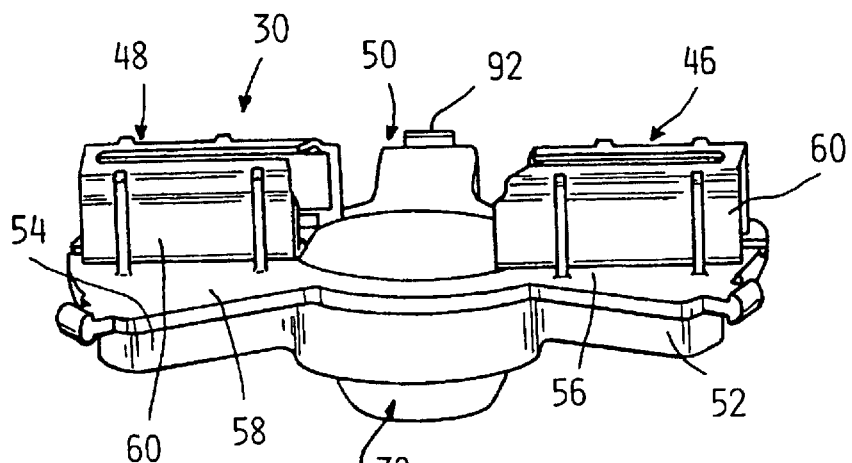
Figure 8:
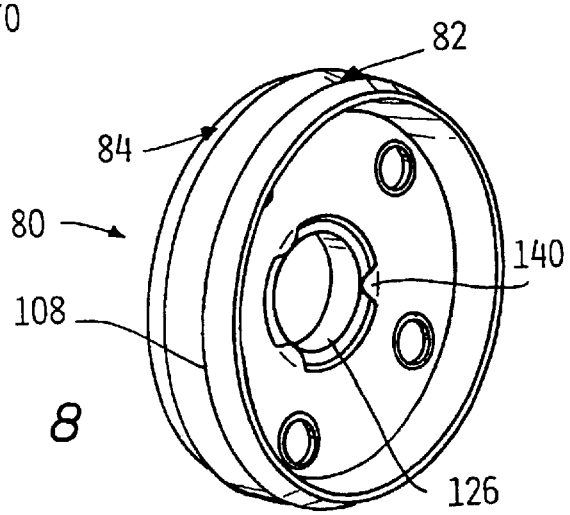
FIG. 8 is a perspective view of the lubricant recirculation member shown in FIG. 4.

A commutator 40 is fixed to the shaft 24 adjacent to one end of the lamination stack 35 of the armature 34. At least two brushes 42 and 44 are disposed in a position to contact the commutator 40 as the armature 34, including the shaft 24, rotate. The brushes 42 and 44 are mounted in brush boxes 46 and 48, respectively, on the holder 30 as shown in FIGS. 5–7. The holder 30 is formed of an integral, one-piece unitary member of a suitable insulating plastic, such as polybutylene terepthalate (PBT), polypropylene styrene (PPS), or polyphtalamide (PPA), for example, as well as thermoset plastics.

As shown in FIGS. 5–7, the holder 30 has a generally planar array shape formed of three leg portions 50, 52, and 54 which are circumferentially spaced about a longitudinal axis through the center of the holder 30. Adjoining filler portions between two adjacent legs 50, 52, and 54 are filled in with continuous material in the same plane as the legs 50, 52, and 54. These filler portions 56 and 58 define platforms for the brush box carriers 46 and 48, respectively.

Each brush box 46 and 48 is formed of a pair of sidewalls 60 and 62 which project outwardly from the filler portions 56 and 58. A top wall 64 extends between outer edges of the sidewalls 60 and 62. A slot 66 is formed in each top wall 64 for a brush shunt, not shown, connected to each brush 42 and 44.

The sidewalls 60 and 62 of each brush 46 and 48 slidably receive one of the brushes 42 and 44. A spring, such as a constant force spring 43, is mounted at one end in a spring holder 68 formed on the filler portions 56 and 58 and is extendable into the interior of each brush box 46 and 48 where it wraps around the radially outer end of each brush 42 or 44 to normally bias the brushes 42 and 44 radially inward toward the longitudinal axis extending through the center of the holder 30 where the brushes 42 and 44 electrically engage the rotating commutator 40 on the shaft 24 as shown in FIG. 3.

As shown in FIGS. 5–7, a central portion 70 of the holder 30 projects out of the plane of the legs 50, 52, and 54 and the filler portions 56 and 58 to form a necked down receptacle with a through aperture 72 at one end. As shown in FIG. 5, a plurality of longitudinally extending, circumferentially spaced fingers 74 project longitudinally from an end of the central portion 70, forming a mount for a bushing or bearing 78. Each finger 74 has an inward extending lip 76 at a longitudinal outer end. The lip 76 snaps around the bushing or bearing 78 press fit into the interior of the circumferentially deployed fingers 74.

The second or rear bushing 78 is preferably a sleeve bushing or bearing as compared to a ball bearing used in other motor configurations. The bushing 78, like the first bushing 22, has no moving parts. However, the first and second bushings 22 and 78 are provided with generally spherical peripheral edges for self-alignment within the respective bushing holder structure. It will be understood that the first and second bushings 22 and 78 are also referred to as spherical sleeve bearings.

Figure 3:
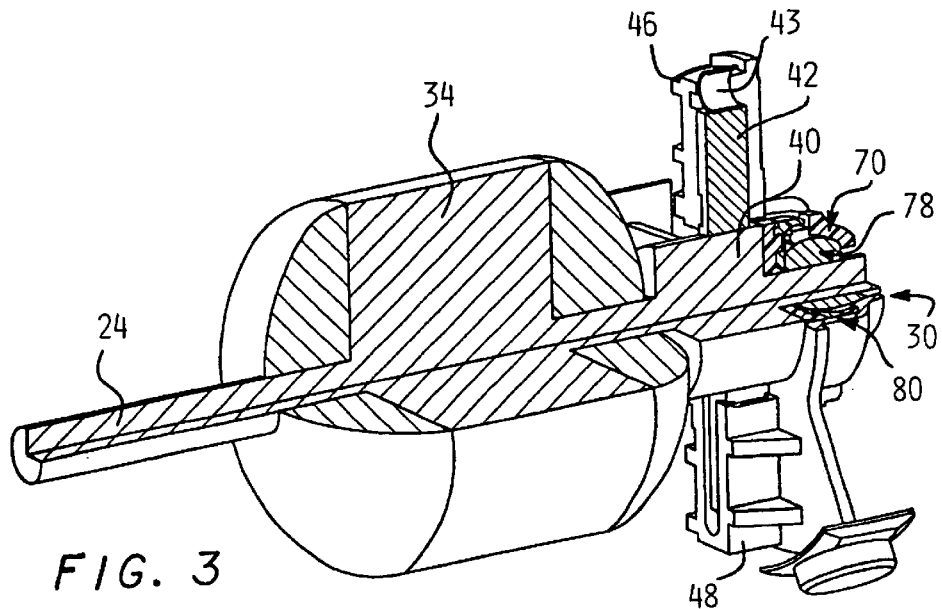
FIG. 3 is a partially cross-sectioned, partial perspective view showing the blower motor of the present invention.
Figure 4:
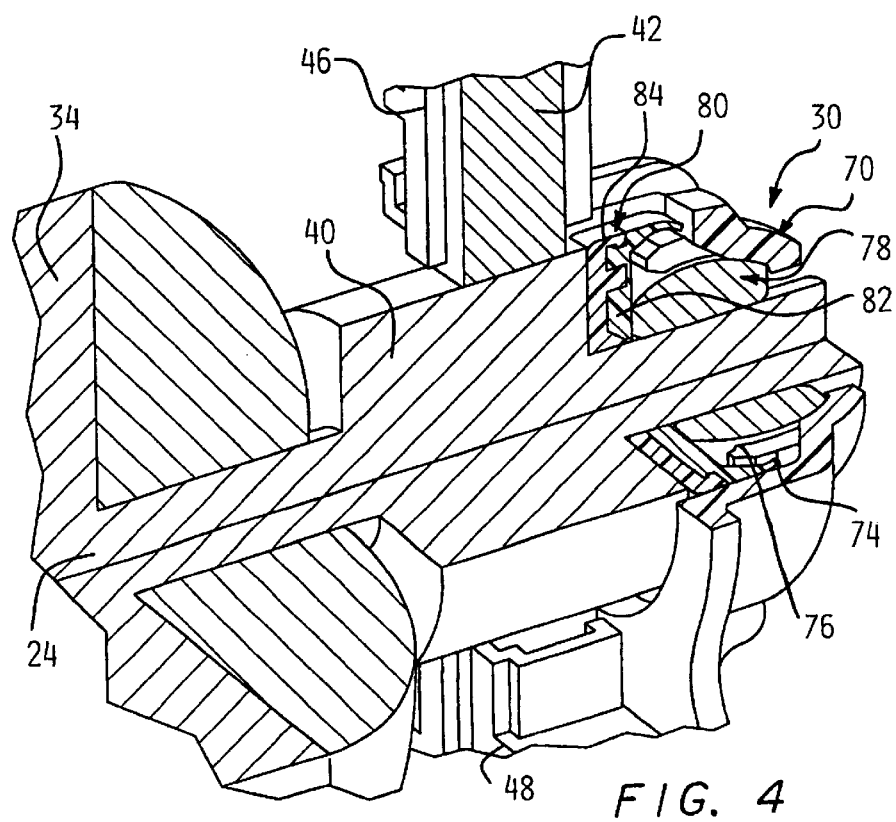
FIG. 4 is an enlarged, partially cross-sectioned, perspective view of the blower motor shown in FIG. 3.

As shown generally in FIGS. 3 and 4, and in greater detail in FIGS. 8–15, a lubricant recirculation member 80 commonly known as an "oil slinger" or "oil thrower", is positioned between the commutator 40 and the second bushing 78. In one respect, the oil slinger 80 is formed of an integral body having two distinct, but unitarily joined first and second portions 82 and 84, each formed of a different material for a different function. The first or oil thrower portion 82 of the oil slinger 80 has a semi-circular, concave shape with outer edges curved or angled toward the second bushing 78. The inward curved or angled ends of the first portion 82 and the overall position of the oil slinger 80 adjacent to and at least partially surrounding the second bushing 78 enables any lubricant which is excreted from the oil or lubricant impregnated second bushing 78 to be thrown or re-circulated back toward the second bushing 78 wherein it is reabsorbed by the bushing 78. This therefore keeps the lubricant from reaching the other electrically conductive portions of the motor 10, such as the commutator 40.

The second, or vibration dampening portion, 84 of the oil slinger 80 is formed of a suitable vibration dampening material. The first and second portions 82 and 84 are preferably double molded together to form the integrated, one-piece oil slinger 80. The second portion 84 abuts the commutator 40.

More specifically, as shown in FIGS. 8–15, the oil throw portion 82 of the oil slinger 80 is formed of a suitable wear resistant material as a wear surface of the oil throw portion 82 rotatably engages the bushing 78 during rotation of the motor shaft. For example, the oil throw portion 82 is formed of a molybdenum disulfide ($MSO_2$) filled nylon 6,6 sold commercially under the trade name NYLATRON.

The oil throw portion 82 includes a generally annular base 100 having a central aperture 102. The base 100 has a first surface 104 which acts as a wear surface as it is disposed in movable contact with the second bushing 78. The opposite surface 106 of the base 100 is disposed in contact with the vibration dampening portion 84 which forms part of the oil slinger 80.

A concave shaped side wall 108 projects from the periphery of the base 100. The specific shape of at least the inner surface of the sidewall 108 can take any shape as long as it functions to form a pocket within the oil slinger 80 and to direct any lubricant excreted by the bushing 78 back toward the bushing 78 and away from the adjacent electrically conductive portions of the motor, such as the commutator 40. In a specific implementation, the side wall 108 has a generally inward angled inner surface formed of a first radially outward angled wall 110 and a contiguous radially inward extending end wall 112. The inner walls, 110 and 112 form an interior pocket between the wear surface 104 on the base 100 and the outer edge 114 of the end wall 112, which receives at least a portion of the second bushing 78 and the fingers 74 on the brush card holder as shown in FIG. 10.

Figure 9:
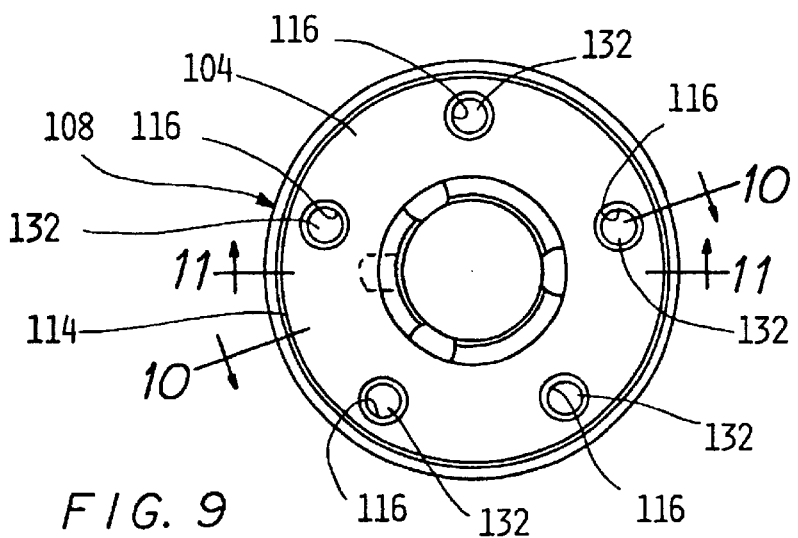
FIG. 9 is a front elevational view of the lubricant recirculation member shown in FIG. 8.

A plurality of interior bores 116, with five interior bores 116 being shown by example, are disposed in a circumferential arrangement around the base 100 between the central bore 102 and the outer periphery of the side wall 108. Each bore 116 has a countersunk end extending inward from the wear surface 104 as shown in FIGS. 9 and 10. The inner surface of the countersunk portion 118 serves as a datum line for the material of the vibration dampening portion 84 as described hereafter.

Figure 11:
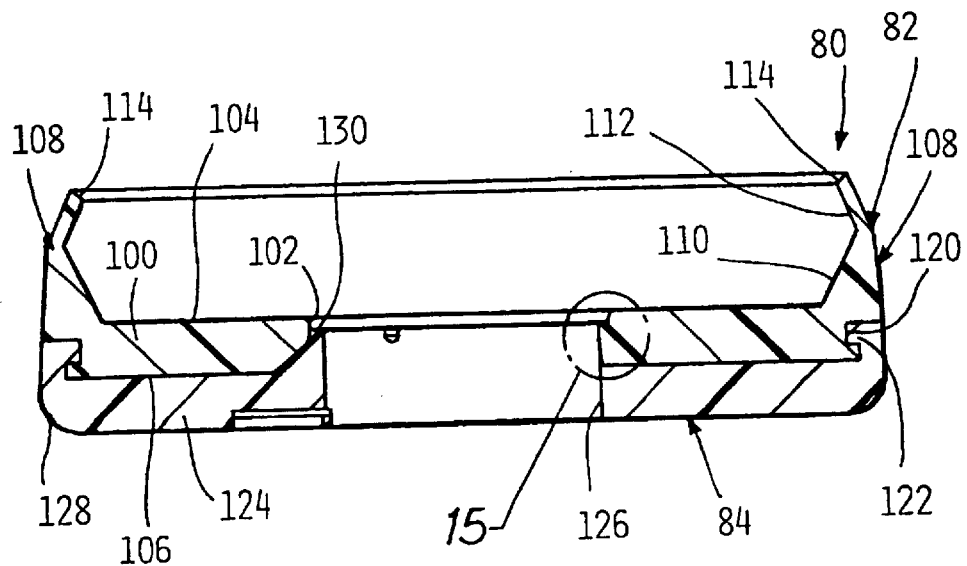
FIG. 11 is a cross-sectional view generally taken along line 11—11 in FIG. 9.
Figure 10:
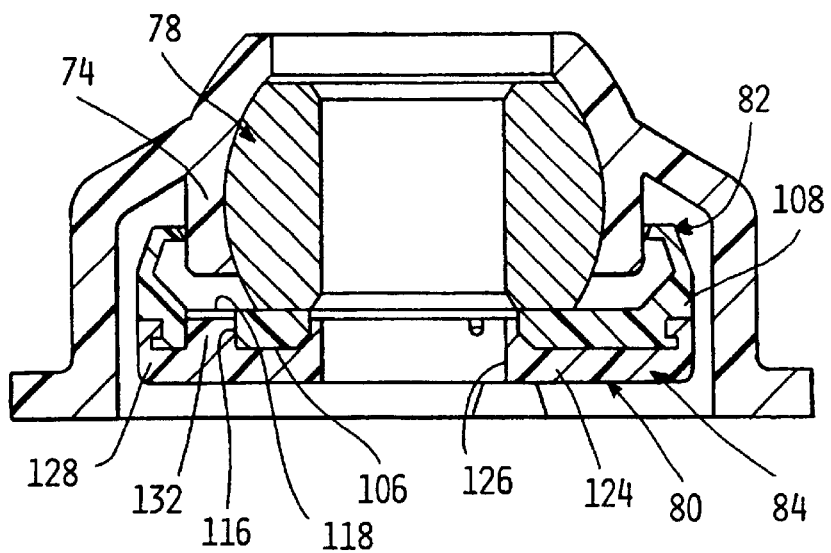
FIG. 10 is a cross-sectional view generally taken along line 10—10 in FIG. 9.

In one aspect of the invention shown in FIGS. 10 and 11, the oil throw portion 82 is mechanically locked to the vibration dampening portion 84 by an inward extending recess 120 formed about the peripheral edge of the base 100 and communicating with the surface 106. The recess 120 receives and locks with a complementary notched projection 122 having an inwardly extending 1end in the vibration dampening portion 84.

Figure 12:
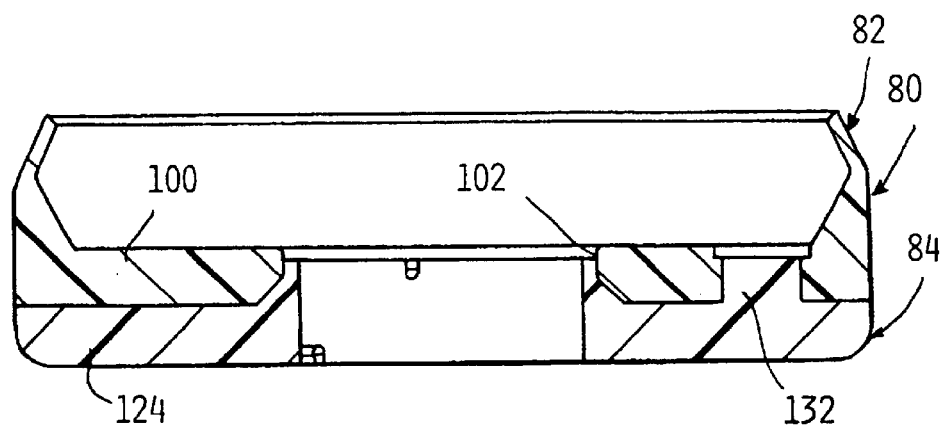
FIGS. 12 and 13 are cross-sectional views similar to FIGS. 10 and 11, respectively, by showing an alternate aspect of the lubricant recirculation member shown in FIG. 9.
Figure 13:
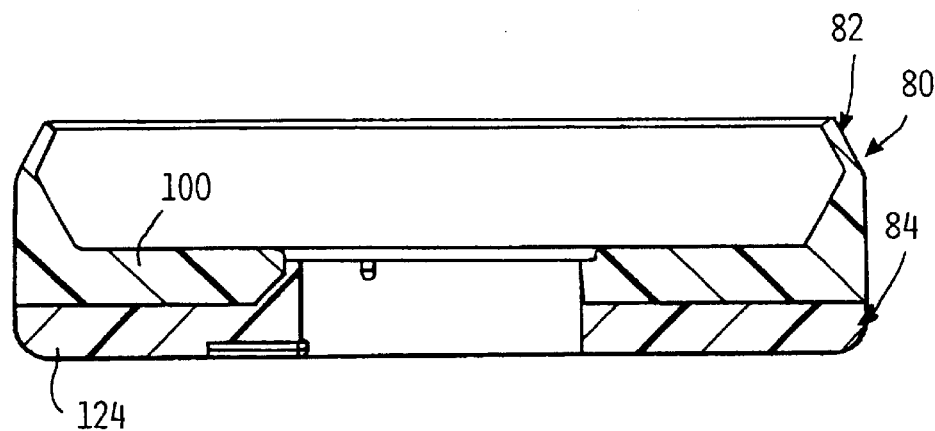

Alternately, as shown in FIGS. 12 and 13, the interlocking portions 120 and 122 can be eliminated so as to only rely on the mechanical joint between the oil throw portion 82 and the vibration dampening portion 84 afforded by posts 132 of the oil throw portion 84 projecting into the bores 116 of the oil throw portion 82 as described hereafter.

The vibration dampening portion 84 also has a generally annular shape formed of a central wall 124 having a central bore 126 and an outer peripheral sidewall 128. The central bore 126 includes a necked down end portion which projects into the central bore 102 in the oil throw portion 82 for a predetermined distance to a datum line 130. In addition, the plurality of posts 132 project from the central wall 124 into the bores 116 to the datum line formed by the countersunk surface 118 in each bore 116 of the oil throw portion 82.

The vibration dampening portion 84 is formed of a suitable vibration dampening material, such as a thermoplastic elastomer, specifically an Arnital polyether ester copolymer elastomer, PM351 or PM581, believe to contain polyether esters sold by DSM Engineering Plastic, Evansville, Indiana. Both of these materials are polyester elastomers having 58 Shore D.

In assembling the entire oil slinger 80, the oil throw portion 82 is first molded to the shape shown in FIGS. 9–15, either with the interlocking notch or recess 120 in FIGS. 10 and 11 or without the recess 120 as shown in FIGS. 12 and 13. The fully formed oil throw portion 82 is then inserted into a second mold where the vibration dampening portion 84 is double molded into intimate, unitary mechanical interlocking contact with the oil throw portion 82. During this second molding operation, the notched projection 122 is formed in the recess 120, infused, and the posts 132 are formed in the bores 116 to mechanically interlock the oil throw portion 82 to the vibration dampening portion 84.

Figure 14:
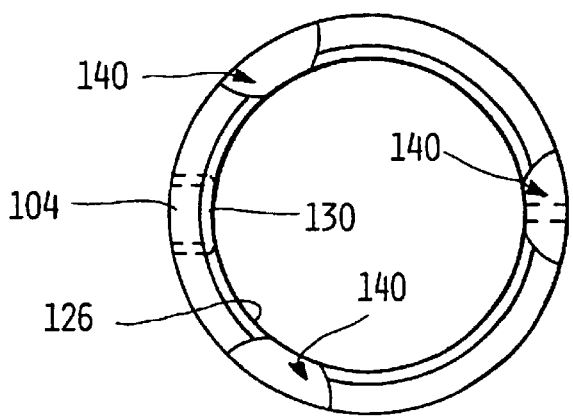
FIG. 14 is an enlarged view of the central portion of the lubricant recirculation member shown in FIG. 9.
Figure 15:
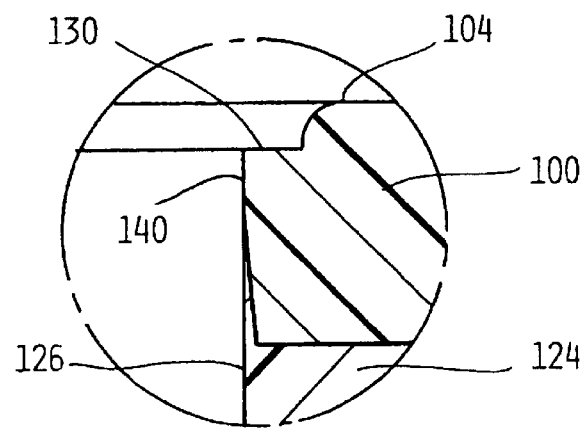
FIG. 15 is an enlarged view of the circled portion of FIG. 11.

An added wear feature of the present invention is shown in greater detail in FIGS. 14 and 15. In this aspect of the invention, a plurality, such as three (3) equi-circumferentially spaced fingers 140, formed of the harder material of the oil throw portion 82 project inward over the inner edge of the necked portion of the softer, more resilient material of the vibration dampening portion 84. The radially inner surface of the fingers 140 lies in coaxial alignment with the inner surface of the bore 126 through the central wall 124 of the vibration dampening portion 84 and serves to center the motor shaft 24 within the oil slinger 80. At the same time, substantially all of the remaining inner surface of the bore 126 is formed of the resilient material of the vibration dampening portion 84 which acts as a seal to prevent lubricant from the bushing 78 from traveling along the shaft 24 into contact with the commutator 40.

In addition, during assembly where the shaft 24 is forced through the bore 126 of the oil slinger 80, the fingers 140 serve as stops to prevent or limit excessive stretching or movement of the radially innermost portions of the neck down portion of the vibration dampening portion 84 past the datum line 130.

Referring back to FIGS. 5–7, grommets 90, preferably formed of a resilient material, such as rubber or a resilient plastic, are mountable over fingers 92 formed on the ends of each of the legs 50, 52, and 54. Each of the fingers 92 projects radially outward from the end of the corresponding legs 50, 52, and 54 and has a hook-like projection formed at an outer end. The projection engages a lip formed on the inner edge of an internal bore in each grommet 90 to securely hold each grommet 90 on the corresponding finger 92. The grommets 90 can alternately be over molded on the end of the fingers 92.

Figure 2:
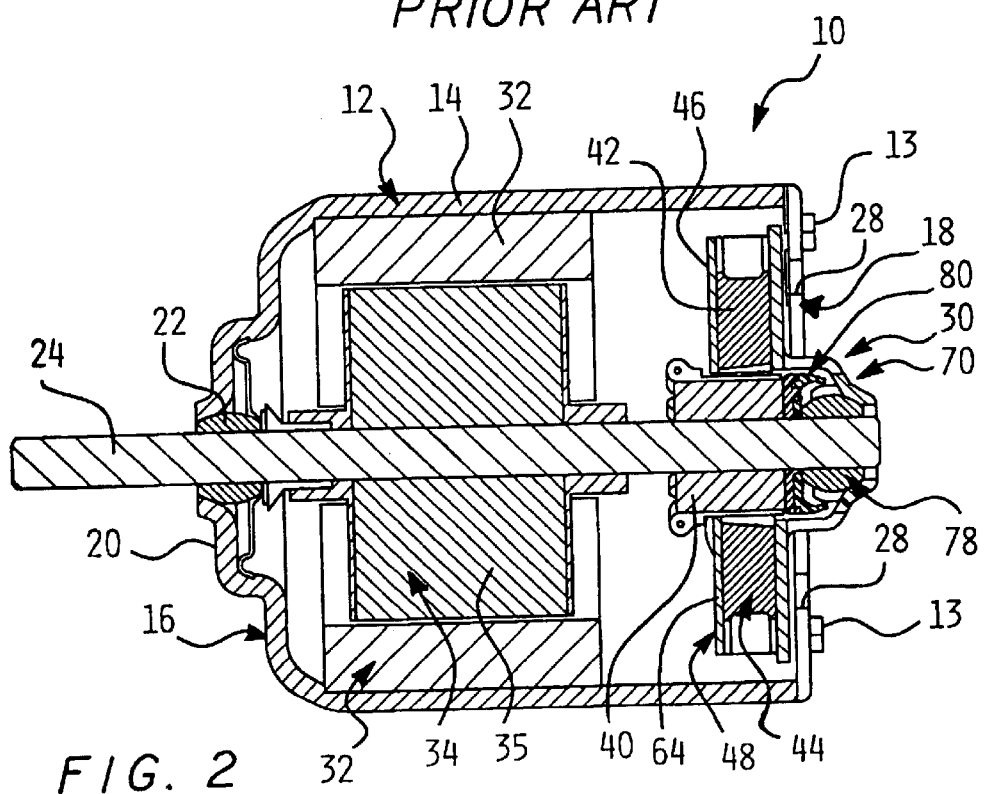
FIG. 2 is a longitudinal cross-sectional view of an electric blower motor having an integral brush card bushing holder according to the present invention mounted therein.

As shown in FIG. 2, the grommets 90 are sized to slide into the notches formed in the motor housing 12. The grommets 90 therefore isolate any vibrations of the holder 30 and the bushing 78, shaft 24 and brushes 42 and 44 from the motor housing 12.

In assembling the motor 10, the second bushing 78 is first inserted into central portion 70 of the holder 30 and is fixedly secured within the holder 30 by snap engagement with the lip 76 on the fingers 74. The brushes 42 and 44 are separately inserted into the brush boxes 46 and 48 within the springs and retracted against the springs.

The oil slinger 80 is inserted over the end of the shaft 24 and butts up against the commutator 40. The holder 30 is then mounted over the shaft 24 by locating the shaft 24 with the rear bushing 78.

Next, the grommets 90 are aligned with notches in the motor housing 12 and slidably inserted into the notches until the grommets 90 bottom out on the inner closed end of the notches.

In summary, there has been disclosed a unique lubricant recirculation member which combines in a single part diverse functions previously provided by a number of separate members requiring separate assembly steps and piece parts. The lubricant recirculation member is formed as a one piece member of two joined, double molded portions which provide the required oil or lubricant recirculation feature, as well as a wear surface in contact with the bushing, and a vibration dampening layer between the bushing and the adjacent rotating commutator.

What is claimed is:

1. An electric motor comprising:
   a housing having first and second ends;
   a rotatable shaft extending through the housing;
   a commutator disposed in the housing about the shaft;
   a plurality of brushes disposed in the housing and engagable with the commutator;
   a bushing mounted in the housing in engagement with the shaft; and
   a lubricant recirculation member disposed in the housing about the shaft between the commutator and the bushing, the lubricant recirculation member in the form of a body having a unitarily joined first lubricant recirculation and wear surface portion and a second vibration dampening portion.

2. The motor of claim 1 wherein:
   the first portion has an internal cavity with a side wall shaped to recirculate lubricant away from the commutator.

3. The motor of claim 1 wherein:
   the first and second portions have complementary, mating members for mechanical interlock of the first and second portions.

4. The motor of claim 1 wherein:
   the second portion of the body fixedly engages the motor shaft.

5. The motor of claim 4 wherein:
   the second portion is formed of a thermoplastic elastomer.

6. The motor of claim 5 wherein:
   the thermoplastic elastomer is a polyether ester copolymer.

7. The motor of claim 1 further comprising:
   complementary peripheral interlock members formed on the first and second portions.

8. The motor of claim 7 wherein:
   the complementary interlock members include annular radially inward and radially outward complementary members on the first and second portions.

9. An electric motor comprising:
   a housing having first and second ends;
   a rotatable shaft extending through the housing;
   a commutator disposed in the housing about the shaft;
   a plurality of brushes disposed in the housing and engagable with the commutator;
   a bushing mounted in the housing in engagement with the shaft;
   a lubrcant recirculation member disposed in the housing about the shaft between the commutator and the bushing, the lubricant recirculation member in the form of a body having a unitarily joined first lubricant recirculation and wear surface portion and a second vibration dampening portion; and
   a plurality of circumferentially spaced fingers extending from the first portion into a central bore in the second portion, a radially innermost surface of each of the plurality of fingers engaging the shaft of the motor to center the lubricant recirculation member about the shaft.

10. An electric motor comprising:
    a housing having first and second ends;
    a rotatable shaft extending through the housing;
    a commutator disposed in the housing about the shaft;
    a plurality of brushes disposed in the housing and engagable with the commutator;
    a bushing mounted in the housing in engagement with the shaft; and
    a lubricant recirculation member disposed in the housing about the shaft between the commutator and the bushing, the lubricant recirculation member in the form of a body having a unitarily joined first lubricant recirculation and wear surface portion and a second vibration dampening portion; and wherein the first portion of the body of the lubricant recirculation member is formed of molybdenum disulfide filled nylon 6, 6.

11. The motor of claim 1 wherein the first portion of the body further comprises:
    a base having a wear surface contacting the bushing; and
    a non-linear sidewall extending away from the base to direct lubricant from the bushing away from the base.

12. The motor according to claim 11 wherein the sidewall has a generally inward angled inner surface formed of a first radially outward angled wall and a contiguous radially inward extending end wall.

13. The motor according to claim 11 wherein the base includes a plurality of interior bores disposed circumferentially between a central bore of the base and an outer periphery of the sidewall and wherein the second portion is double molded into unitary mechanical interlocking contact with the first portion by a plurality of posts projecting from the second portion into the bores.

14. The motor according to claim 4, further comprising:
    a plurality of circumferentially spaced fingers extending from the first portion into a central bore in the second portion, a radially innermost surface of each of the plurality of fingers engaging the shaft of the motor to center the lubricant recirculation member about the shaft.

15. The motor according to claim 9 wherein the first and second portions have complementary, mating members for mechanical interlock of the first and second portions.

16. The motor of claim 9 wherein the first portion of the body further comprises a base having a portion in contact with the bushing and a non-linear sidewall extending from an outer peripheral edge of the base in a direction of the bushing to direct lubricant from the bushing toward the bushing.

17. The motor of claim 16 wherein the base includes a plurality of interior bores disposed circumferentially between a central bore of the base and an outer periphery of the sidewall and wherein the second portion is double molded into unitary mechanical interlocking contact with the first portion by a plurality of posts projecting from the second portion into the bores.

18. The motor according to claim 10, further comprising:
    a plurality of circumferentially spaced fingers extending from the first portion into a central bore in the second portion, a radially innermost surface of each of the plurality of fingers engaging the shaft of the motor to center the lubricant recirculation member about the shaft.

19. The motor according to claim 10 wherein the first and second portions have complementary, mating members for mechanical interlock of the first and second portions.

20. The motor of claim 10 wherein the first portion of the body further comprises a wear surface contacting the bushing and a non-linear sidewall extending from an outer peripheral edge of the wear surface in a direction of the bushing to direct lubricant from the bushing toward the bushing.

\* \* \* \* \*